(12) United States Patent
Al-Khaldi et al.

(10) Patent No.: US 11,467,083 B2
(45) Date of Patent: Oct. 11, 2022

(54) SYSTEM AND METHOD FOR ANALYZING CATHODIC PROTECTION CURRENT SHIELDING OF A COATING

(71) Applicant: Saudi Arabian Oil Company, Dhahran (SA)

(72) Inventors: Turki A. Al-Khaldi, Dammam (SA); Anas S. Rushaid, Khobar (SA); Abduljalil Al-Rasheed, Dhahran (SA); Naim M. Dakwar, Dhahran (SA); Ebadul Z. Al Haque, Dhahran (SA); Balasubramani Bakthavatchalu, Dhahran (SA); Mohammed A. Alrudayni, Al Khobar (SA)

(73) Assignee: Saudi Arabian Oil Company, Dhahran (SA)

(*) Notice: Subject to any disclaimer, the term of this patent is extended or adjusted under 35 U.S.C. 154(b) by 425 days.

(21) Appl. No.: 16/704,863

(22) Filed: Dec. 5, 2019

(65) Prior Publication Data

US 2021/0172860 A1 Jun. 10, 2021

(51) Int. Cl.
*G01N 17/04* (2006.01)
*C23F 13/04* (2006.01)
(Continued)

(52) U.S. Cl.
CPC .......... *G01N 17/043* (2013.01); *C23F 13/04* (2013.01); *G01N 17/02* (2013.01); *G01N 27/20* (2013.01)

(58) Field of Classification Search
CPC ...... G01N 17/02; G01N 17/043; G01N 27/20; C23F 13/04
See application file for complete search history.

(56) References Cited

U.S. PATENT DOCUMENTS

| 4,255,242 A | * | 3/1981 | Freeman | ................. C23F 13/04 204/196.03 |
| 4,504,365 A | * | 3/1985 | Kellner | ................. C23F 13/04 436/6 |

(Continued)

FOREIGN PATENT DOCUMENTS

| CN | 104515731 A | * | 4/2015 |
| EP | 2392911 A1 | | 12/2011 |
| JP | 2001215188 A | * | 8/2001 |

OTHER PUBLICATIONS

ASTM G95—Test Methods for Cathodic Disbondment Test of Pipeline Coatings.

(Continued)

*Primary Examiner* — Natalie Huls
(74) *Attorney, Agent, or Firm* — Leason Ellis LLP

(57) ABSTRACT

A system, apparatus, and method for analyzing cathodic protection (CP) current shielding of a coating are provided. The system includes: a test cell configured to have a coating film disposed therein and to be filled with electrically conductive solution surrounding the coating film; an electrical resistance (ER) probe mounted through a port of the test cell; and a potentiostat configured to: apply potential to the test cell to thereby polarize a sensing element of the ER probe such that the ER probe is configured to measure data indicative of a corrosion rate of the sensing element when the coating film is disposed within the test cell and while a CP current flows through the sensing element; and measure a current density through the sensing element in order to indicate an extent of CP current shielding of the coating film.

21 Claims, 7 Drawing Sheets

(51) Int. Cl.
  G01N 17/02 (2006.01)
  G01N 27/20 (2006.01)

(56) References Cited

U.S. PATENT DOCUMENTS

| | | | | |
|---|---|---|---|---|
| 4,755,267 A | * | 7/1988 | Saunders | C23F 13/04 |
| | | | | 205/775.5 |
| 4,863,572 A | * | 9/1989 | Jasinski | G01N 17/02 |
| | | | | 205/777 |
| 5,712,559 A | * | 1/1998 | Moore | G01N 17/00 |
| | | | | 422/53 |
| 6,772,622 B2 | | 8/2004 | Moghissi et al. | |

OTHER PUBLICATIONS

Latino, Mauricio Leonel, et al. "An overview on cathodic shielding produced by disbonded coatings." Proceedings of the 2016 Corrosion and Prevention Conference. Australasian Corrosion Association, 2016.

Ruschau, Gregory, and Yue Chen. "Determining the CP shielding behavior of pipeline coatings in the laboratory." Corrosion 2006. NACE International, 2006.

Latino, Mauricio, et al. "Self-validating electrochemical methodology for quantifying ionic currents through pipeline coatings." Progress in Organic Coatings 120 (2018): 153-159.

Kuang, Da, and Y. Frank Cheng. "Study of cathodic protection shielding under coating disbondment on pipelines." Corrosion Science 99 (2015): 249-257.

Song, F. M., et al. "Corrosion under disbonded coatings having cathodic protection." Materials performance 42.9 (2003): 24-26.

Narozny, M., K. Zakowski, and Kazimierz Darowicki. "Application of Electrochemical Impedance Spectroscopy to evaluate cathodically protected coated steel in seawater." Construction and Building Materials 181 (2018): 721-726.

Dr. Amal Al-Borno. Dr. Xiani Chen "Laboratory Test Methods to Study Potential CP Shielding for an External Pipeline Liquid Epoxy Coating and Support Geotextile Pipeline Weight Bags".

International Search Report and Written Opinion in Corresponding PCT Application No. PCT/US2020/063369 dated Mar. 31, 2021. 11 pages.

* cited by examiner

SYSTEM AND METHOD FOR ANALYZING CATHODIC PROTECTION CURRENT SHIELDING OF A COATING

FIELD OF THE DISCLOSURE

The present disclosure relates generally to cathodic protection, and, more particularly, to systems and methods for analyzing cathodic protection current shielding of a coating.

BACKGROUND OF THE DISCLOSURE

Cathodic protection (CP) is implemented to protect an object from corrosion by causing the object to be a cathode of an electrochemical cell. The object can be, for example, an underground storage tank or a buried steel pipeline. The object is coupled to a device that serves as an anode, thereby causing flow of a protective current and corresponding movement of cations toward the object to be protected. However, flow of this protective current can be disrupted based on factors such as coating type, age, condition, and presence and shape of delamination or disbondment, resulting in shielding of the cathodic protection current from reaching the object to be protected.

Cathodic protection current shielding sometimes leaves the object to be protected more susceptible to corrosion, particularly as spacing between a disbonded or delaminated coating and the pipeline or other object to be protected increases. Shielded areas cannot be detected by currently available aboveground survey techniques. As such, shielded areas often go unnoticed as coatings age and lose their adhesion, presenting a serious concern for pipeline integrity.

In view of the problems posed by coating delamination and disbondment, several testing methodologies are currently in use for attempting to determine the extent of cathodic protection shielding of different types of coatings. The ASTM G95 standard method focuses on cathodic disbondment testing, where a holiday is drilled onto a coated test coupon to simulate a disbondment. Another technique involves placing a coating layer above a test coupon with a 1.5 mm gap containing an electrolyte in order to simulate a disbondment, but does not perform in-situ measurement of corrosion rate. Another known technique utilizes a cell with cathodic and anodic chambers and an intact coating film placed in the cell in order to quantify permeability and cathodic shielding characteristics of the coating film, but does not perform in-situ measurements and does not measure corrosion rate.

Another known technique is described in U.S. Pat. No. 6,772,622, assigned to Southwest Research Institute, and involves fabricating one or more types of coating disbondment geometry on an outer surface of a metallic coupon structure. For example, a recess or holiday can be machined into the surface of the coupon. The coupon can be fitted with various sensors to monitor the conditions of the disbondment. The coupon can also be buried near a pipeline for which cathodic protection is to be monitored. However, assessment of effectiveness of a coating and the effects of a disbondment using the technique of the '622 patent disadvantageously requires machining a recess or holiday onto a coupon and then burying the coupon in an attempt to perform in situ determinations.

It is in regard to these and other problems in the art that the present disclosure is directed to provide a technical solution for systems and methods that analyze corrosion rate and CP current shielding of a coating in situ in order to assess effectiveness of the coating, while overcoming the problems that accompany existing CP shielding simulation techniques.

SUMMARY OF THE DISCLOSURE

According to an embodiment consistent with the present disclosure, a system for analyzing cathodic protection (CP) current shielding of a coating is provided. The system includes: a test cell configured to have a coating film disposed therein and to be filled with electrically conductive solution surrounding the coating film; an electrical resistance (ER) probe mounted through a port of the test cell, the ER probe comprising a sensing element positioned within the test cell such that when the test cell is filled with the electrically conductive solution, the sensing element is in contact with the electrically conductive solution; and a potentiostat configured to: apply potential to the test cell to thereby polarize the sensing element of the ER probe such that the ER probe is configured to measure data indicative of a corrosion rate of the sensing element when the coating film is disposed within the test cell and while a CP current flows through the sensing element; and measure a current density through the sensing element in order to indicate an extent of CP current shielding of the coating film.

In an embodiment, the corrosion rate is a first corrosion rate, the current density is a first current density, and the system further includes a workstation communicatively coupled to the ER probe, wherein when the coating film is not disposed within the test cell, the ER probe is configured to measure data indicative of a second corrosion rate of the sensing element when the potential is applied to the test cell to allow the workstation to compare the first and second corrosion rates of the sensing element, and the potentiostat is configured to measure a second current density through the sensing element when the potential is applied to the test cell in order to further indicate the extent of CP current shielding of the coating film.

In an embodiment, the coating film is a first coating film comprising a first type of coating, the corrosion rate is a first corrosion rate, the current density is a first current density, and the system further includes a workstation communicatively coupled to the ER probe, wherein when a second coating film comprising a second type of coating is disposed within the test cell in place of the first coating film, the ER probe is configured to measure data indicative of a second corrosion rate of the sensing element when the potential is applied to the test cell to allow the workstation to compare the first and second corrosion rates of the sensing element, and the potentiostat is configured to measure a second current density through the sensing element when the potential is applied to the test cell to allow the workstation to compare extents of CP current shielding of the first coating film and the second coating film.

In an embodiment, the system further includes a counter electrode positioned at least partially inside the test cell.

In an embodiment, the system further includes a reference electrode positioned at least partially inside the test cell, wherein the potentiostat is connected to the reference electrode, to the counter electrode, and to a terminal electrically connected to the sensing element.

In an embodiment, the sensing element comprises a carbon steel sensing element.

In an embodiment, the system further includes: an ER data logger communicatively coupled to the ER probe and configured to receive the data indicative of the corrosion rate of the sensing element; and a workstation communicatively coupled to the ER data logger and configured to process the data indicative of the corrosion rate of the sensing element to determine the corrosion rate of the sensing element.

In an embodiment, the test cell includes: a first chamber configured to contain a first portion of the electrically conductive solution; and a second chamber configured to contain a second portion of the electrically conductive solution, wherein a volume of the second chamber is greater than a volume of the first chamber, wherein the coating film is disposed within the test cell so as to divide the first chamber and the second chamber.

In an embodiment, the test cell further includes a sealing ring disposed between the coating film and an inner wall of the test cell.

In an embodiment, the test cell further includes a pH probe port in the first chamber, the pH probe port configured to have a pH probe positioned therein to measure a pH of the electrically conductive solution.

In an embodiment, the test cell further includes: a first fill port in the first chamber, the first fill port configured to receive the first portion of the electrically conductive solution into the first chamber; and a second fill port in the second chamber, the second fill port configured to receive the second portion of the electrically conductive solution into the second chamber.

According to another embodiment consistent with the present disclosure, an apparatus for analyzing cathodic protection (CP) current shielding of a coating is provided. The apparatus includes: a first chamber configured to contain a first portion of an electrically conductive solution, the first chamber including an electrical resistance (ER) probe port and a working electrode terminal; a second chamber configured to contain a second portion of the electrically conductive solution, wherein a volume of the second chamber is greater than a volume of the first chamber, wherein the first chamber and the second chamber are configured to be divided from each other by a coating film disposed between the first chamber and the second chamber; and an ER probe mounted through the ER probe port of the first chamber, the ER probe including a sensing element positioned within the first chamber, wherein when a potential is applied to the first chamber such that the sensing element is polarized, the ER probe is configured to measure data indicative of a corrosion rate of the sensing element when the coating film is disposed between the first chamber and the second chamber, wherein the working electrode terminal of the first chamber is configured to allow a measurement of a current density through the sensing element when the potential is applied to the first chamber, such that the measurement of the current density indicates an extent of CP current shielding of the coating film.

In an embodiment, the corrosion rate is a first corrosion rate, the current density is a first current density, and when the coating film is not disposed between the first chamber and the second chamber, the ER probe is configured to measure data indicative of a second corrosion rate of the sensing element when the potential is applied to the first chamber to facilitate comparison of the first and second corrosion rates of the sensing element, and the working electrode terminal is configured to allow a measurement of a second current density through the sensing element when the potential is applied to the first chamber in order to further indicate the extent of CP current shielding of the coating film.

In an embodiment, the coating film is a first coating film comprising a first type of coating, the corrosion rate is a first corrosion rate, the current density is a first current density, and when a second coating film comprising a second type of coating is disposed between the first chamber and the second chamber in place of the first coating film, the ER probe is configured to measure data indicative of a second corrosion rate of the sensing element to facilitate comparison of the first and second corrosion rates of the sensing element, and the working electrode terminal is configured to allow a measurement of a second current density through the sensing element when the potential is applied to the first chamber to facilitate comparison of extents of CP current shielding of the first coating film and the second coating film.

In an embodiment, at least a portion of a reference electrode and at least a portion of a counter electrode are disposed in the second chamber, and a potentiostat is connected to the reference electrode, to the counter electrode, and to the working electrode terminal to apply the potential to the first chamber.

In an embodiment, the apparatus further includes a sealing ring disposed around the coating film at an interface between the first chamber and the second chamber.

In an embodiment, the first chamber further includes a pH probe port configured to have a pH probe positioned therein to measure a pH of the electrically conductive solution.

According to another embodiment consistent with the present disclosure, a method for analyzing cathodic protection (CP) current shielding of a coating is provided. The method includes: disposing a coating film within a test cell; mounting an electrical resistance (ER) probe through a port of the test cell such that a sensing element of the ER probe is within the test cell; using a potentiostat to apply potential to the test cell and polarize the sensing element of the ER probe; measuring, using the ER probe, a corrosion rate of the sensing element while a CP current flows through the sensing element; and measuring a current density through the sensing element in order to determine an extent of CP current shielding of the coating film.

In an embodiment, the corrosion rate is a first corrosion rate, the current density is a first current density, and the method further includes: removing the coating film from the test cell; measuring, using the ER probe, a second corrosion rate of the sensing element while the potentiostat applies the potential to the test cell; measuring a second current density through the sensing element while the potentiostat applies the potential to the test cell; and determining the extent of CP current shielding of the coating film based on at least two of: the first corrosion rate, the second corrosion rate, the first current density, and the second current density.

In an embodiment, the coating film is a first coating film comprising a first type of coating, the corrosion rate is a first corrosion rate, the current density is a first current density, and the method further includes: disposing a second coating film within the test cell in place of the first coating film, the second coating film comprising a second type of coating; measuring, using the ER probe, a second corrosion rate of the sensing element while the potentiostat applies the potential to the test cell; measuring a second current density through the sensing element while the potentiostat applies the potential to the test cell in order to determine an extent of CP current shielding of the second coating film; and assessing an effectiveness of the first type of coating relative to an effectiveness of the second type of coating based on at least two of: the first corrosion rate, the second corrosion rate, the extent of CP current shielding of the first coating film, and the extent of CP current shielding of the second coating film.

In an embodiment, measuring the current density through the sensing element is performed using the potentiostat, and using the potentiostat to apply the potential to the test cell includes coupling the potentiostat to a reference electrode, to a counter electrode, and to a terminal electrically connected to the sensing element.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

Figure 1:
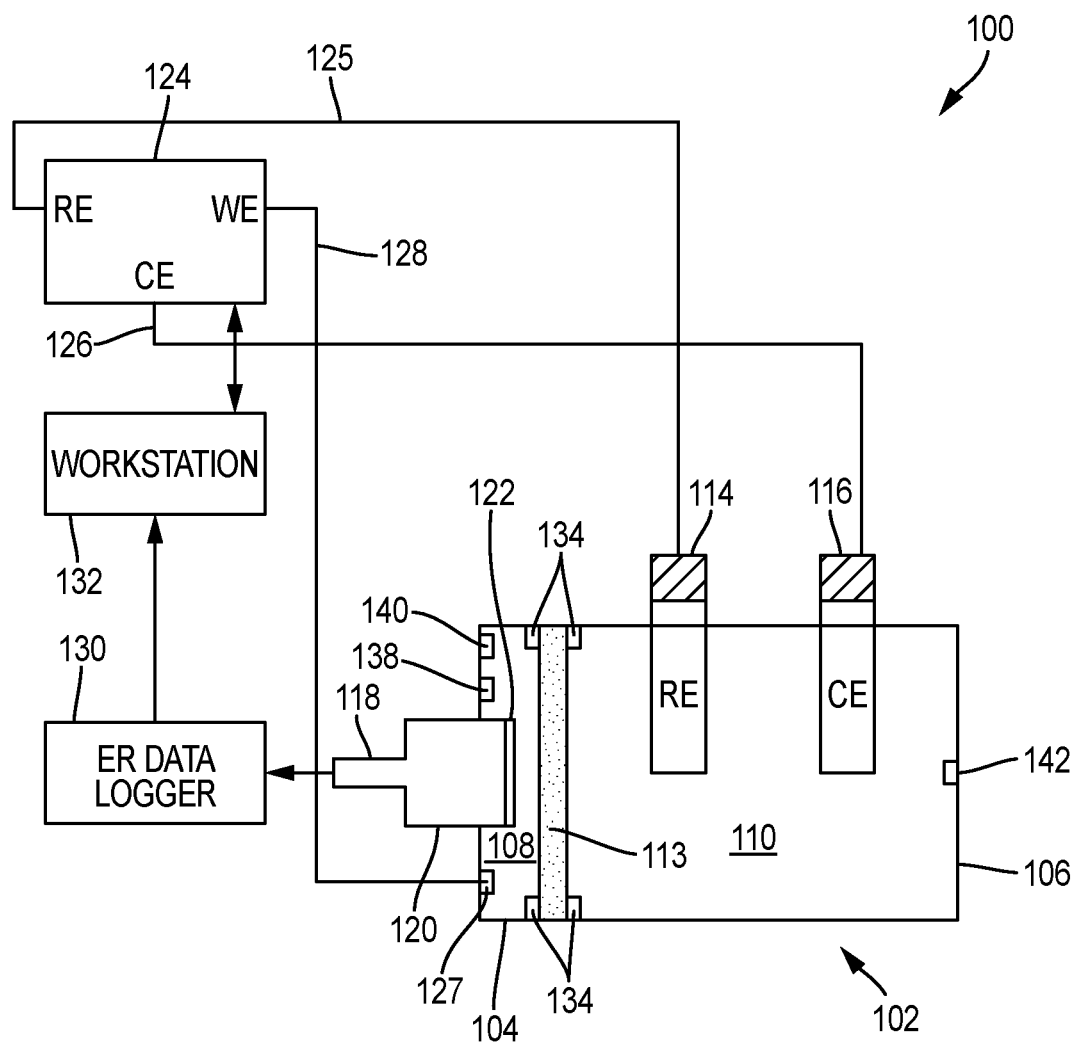
FIG. 1 is a diagram of an example system for analyzing cathodic protection current shielding of a coating, according to an embodiment.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system and method for analyzing cathodic protection (CP) current shielding of a coating. In some such embodiments, a test cell is used for in-situ simulation of the extent of CP current shielding of a coating, and to measure a corrosion rate of a sensing element of an electrical resistance (ER) probe when the sensing element is polarized to a potential at which an underground pipeline or other object will be polarized during implementation of cathodic protection. The test cell contains a coating film in proximity to the ER probe sensing element to simulate a disbonded and/or delaminated coating on a pipe or other object or material to be protected. In embodiments, the coating film is positioned in the test cell so as to divide the test cell into two chambers. The test cell is configured to be filled with an electrically conductive solution to simulate the conditions in soil or seawater, in the case of simulating CP current shielding of a coating of a buried pipeline or coated underwater structure.

A potentiostat applies potential to the test cell and polarizes a surface of an electrical resistance (ER) probe that can be mounted through a port of the test cell. For example, the potentiostat is connected to a reference electrode and a counter electrode that are at least partially within one of the chambers of the test cell, and the potentiostat is also connected to a working electrode terminal to polarize the ER probe sensing element. In an embodiment, the potentiostat polarizes the ER probe sensing element to a potential at which an underground pipeline, underwater structure, or other object to be protected will be polarized during cathodic protection. The ER probe measures data indicative of a corrosion rate of the polarized sensing element while a cathodic protection current flows through the coating film as a result of the applied potential. Simultaneously with measurement of the data indicative of the corrosion rate, a cathodic protection current density through the sensing element is measured using the potentiostat.

This in-situ measurement of CP current density indicates an extent of CP current shielding of the coating film, which along with the simultaneous in-situ measurement of corrosion rate advantageously allows for the production of precise laboratory data even when the simulation of CP current shielding is performed over a short exposure time. The present techniques utilize the application of potential to a test cell and to the ER probe sensing element to simulate CP current shielding without requiring undesirable steps such as drilling a holiday onto a test coupon, maintaining a specific gap between a coating and a test coupon, or burying a test coupon in order to perform measurements. The techniques of the present disclosure thus allow CP current shielding to be efficiently simulated for different types of coatings by changing the type of coating film used in the test cell. Thus, an operator or other person or entity analyzing data from the in-situ measurements described herein can effectively study the extent of shielding of CP current flow through different coating systems and can assess the effect of coating delamination and disbondment.

FIG. 1 is a diagram of an example system 100 for analyzing cathodic protection current shielding of a coating, according to an embodiment. The system 100 includes a test cell 102, of which a cross-sectional view is shown in FIG. 1. As shown in FIG. 1, the test cell 102 includes a first chamber 104 and a second chamber 106. The first chamber 104 is filled with a first portion 108 of electrically conductive solution, and the second chamber 106 is filled with a second portion 110 of the electrically conductive solution. For example, the electrically conductive solution can be obtained by dissolving an electrolyte in water or another solvent such that the resulting electrically conductive solution has a pH similar to soil or seawater, in the case of simulating CP current shielding of the coating on a buried pipeline or offshore structure.

As shown in the example of FIG. 1, a coating film 113 is disposed in the test cell 102 and divides the first chamber 104 from the second chamber 106. The coating film 113 is positioned such that the second chamber 106 has a volume that is greater than a volume of the first chamber 104. The coating film 113 can be made of the same material as a coating for which CP current shielding is to be analyzed. For example, in certain embodiments, the coating film 113 is an epoxy coating, a polyurethane coating, or can be made of any other suitable material or materials.

In some embodiments, as shown in FIG. 1, the system 100 also includes a reference electrode 114 and a counter electrode 116 that are partially disposed within the second chamber 106. In other embodiments, the reference electrode 114 and the counter electrode 116 are entirely disposed within the second chamber 106. The system 100 further includes an electrical resistance (ER) probe 118 that is mounted through a port in the first chamber 104 by positioning a probe mounting 120 through the port of the first chamber 104, as shown in the embodiment of FIG. 1. The ER probe 118 includes a sensing element 122 positioned at an end of the probe mounting 120. In some embodiments, the sensing element 122 is made of the same metal or alloy as the underground pipeline or other object to be protected, and for which corrosion data is required. In an example, the sensing element 122 is made of carbon steel.

A potentiostat 124 is connected to the reference electrode 114 by way of a reference electrode lead 125, to the counter electrode 116 by way of a counter electrode lead 126, and to a working electrode terminal 127 by way of a working electrode lead 128. The connection of the potentiostat 124 to the working electrode terminal 127 allows the potentiostat 124 to apply potential to the first chamber 104 of the test cell so that the sensing element 122 is polarized to a desired potential, such as the potential to which an underground pipeline or other object will be polarized during implementation of cathodic protection. The sensing element 122 thus constitutes a working electrode in the system 100 of FIG. 1, and the potentiostat 124 controls a potential difference between the sensing element 122 and the reference electrode 114. In other embodiments, the working electrode lead 128 is connected to the probe mounting 120 or to any suitable portion of the ER probe 118 to polarize the sensing element 122.

When potential is applied to the sensing element 122, current flows from the counter electrode 116, which constitutes an anode and thus simulates the anode used in impressed current cathodic protection in an underground, offshore, or other environment. This cathodic protection (CP) current flows from the counter electrode 116 through the coating film 113 and the sensing element 122, allowing measurement of the corrosion rate of the sensing element 122 and the extent of CP current shielding of the coating film 113 as further described herein.

The ER probe 118 directly measures data indicative of a corrosion rate of the sensing element 122. For example, the ER probe 118 can use the electrical resistance method to determine corrosion rate of the sensing element 122 when the sensing element 122 is polarized to the potential to be used in cathodic protection. In some embodiments, the ER probe 118 measures a corrosion rate of the sensing element 122 when the coating film 113 is disposed in the test cell 102, and also measures a corrosion rate of the sensing element 122 when the coating film 113 is removed from the test cell 102, as further described below. Because the sensing element 122 is, in some embodiments, made of the same metal or alloy as the underground pipeline or other object to be protected, measurement of the corrosion rate of the sensing element 122 accurately indicates corrosion rate of the metal to be protected. More particularly, measurement of the corrosion rate of the sensing element 122 accurately indicates corrosion rate of the metal to be protected in the presence of a disbondment or delamination simulated by the relative placements of the coating film 113 and the sensing element 122.

The ER probe 118 outputs data indicative of the corrosion rate to an ER data logger 130; in the meantime, a workstation 132 can fetch or receive this data from the ER data logger 130 for analysis as described below. In some embodiments, a portable instrument (not shown) is used to take readings of data from the ER data logger 130 at desired or pre-programmed intervals, and the workstation 132 fetches or receives indications of these readings from the portable instrument. In other embodiments, the functionality of such a portable instrument is integrated into the workstation 132. In any event, the workstation 132 processes the data indicative of the corrosion rate of the sensing element 122 to determine the corrosion rate of the sensing element 122.

In some embodiments, the potentiostat 124 is used to measure a current density of a CP current that flows through the sensing element 122. The current density measurement can be used to determine the extent of CP current shielding of the coating film 113. For example, the potentiostat 124 takes into account the potential applied to the sensing element 122 relative to the potential at the reference electrode 114 in measuring the current density of the cathodic protection current flowing through the first chamber 104 and thus, through the sensing element 122.

In some embodiments, the potentiostat 124 sends data indicative of the measured CP current density to the workstation 132. As further discussed below, in some examples, the workstation 132 can be configured to compare this received data to data indicative of a CP current density when the coating film 113 is not disposed in the test cell 102, or when a different type of coating film is used in place of the coating film 113.

Based on the measurement of the CP current density, and in some cases the potential applied to the sensing element 122, the extent of CP current shielding of the coating film 113 is determinable. The CP current density, along with the corrosion rate of the sensing element 122 as measured using the ER probe 118, are thus measured in-situ while potential is applied to the test cell 102 and without the need for machining a recess or holiday onto a test coupon or burying a test coupon in the field (e.g., near an underground pipeline). The present techniques produce accurate information about the extent of corrosion and CP current shielding after only short-term laboratory exposure and allow the coating film 113 to be removed for analysis of corrosion rate and CP current density in the absence of the coating film 113, as further discussed with respect to FIG. 4B. The present techniques also facilitate efficient replacement of the coating film 113 with another coating film made of a different type of coating, as further discussed with respect to FIG. 4C. In this manner, different types of coatings can be evaluated for their CP current shielding characteristics and effects on corrosion of the material out of which an underground pipeline or other object is made.

As further shown in the embodiment of FIG. 1, a sealing ring 134, such as an O-ring, is used to seal the interfaces between the coating film 113 and the first and second chambers 104 and 106. In another embodiment, a first sealing ring, such as the sealing ring 134, seals the interface between the first chamber 104 and the coating film 113. In this embodiment, a second sealing ring, such as a second O-ring (not shown in FIG. 1), seals the interface between the coating film 113 and the second chamber 106. Additionally, in the example of FIG. 1, the first chamber 104 includes a pH probe port 138 that is configured to have a pH probe positioned therein to measure and/or monitor a pH of the electrically conductive solution. In this manner, the first portion 108 of the electrically conductive solution—and the second portion 110 of the electrically conductive solution that includes the same dissolved electrolyte as the first portion 108—is monitorable to ensure that its pH accurately simulates, for example, the pH of soil or seawater in which an underground pipeline or underwater structure simulated by the sensing element 122 is buried and to enable an operator to take action if the monitored pH varies outside of a prescribed tolerance.

The embodiment of FIG. 1 also shows that the first chamber 104 includes a first fill port 140 and the second chamber 106 includes a second fill port 142. The first fill port 140 receives the first portion 108 of the electrically conductive solution into the first chamber 104 and the second fill port 142 receives the second portion 110 of the electrically conductive solution into the second chamber 106. The first fill port 140 and the second fill port 142 optionally can be used to empty the first chamber 104 and the second chamber 106 of electrically conductive solution. The coating film 113 within the test cell 102 can be removed so as to evaluate the corrosion rate of the sensing element 122 and the cathodic protection current density in the absence of the coating film 113. Additionally or alternatively, the coating film 113 within the test cell 102 can be replaced with a coating film made of a different type of coating so as to evaluate the performance of different types of coatings.

In some embodiments, the coating film 113 is initially disposed on a substrate within the test cell 102. In these embodiments, the substrate (not shown in FIG. 1) can be made of the same material as the object to be protected, and a corrosion rate of the substrate is determined using an electrochemical method. In some such embodiments, the ER probe 118 is replaced by a linear polarization probe (not shown in FIG. 1). In any event, in embodiments including the substrate, the substrate is removed from the test cell 102 after initial measurement of the corrosion rate of the substrate. The measured corrosion rate of the substrate can be used in conjunction with the corrosion rate of the sensing element 122 and/or the CP current density, which are measured as described elsewhere herein, in any suitable manner to further indicate corrosion characteristics of the type of coating used in the coating film 113, an extent of CP current shielding of the type of coating used in the coating film 113, etc.

Figure 2A:
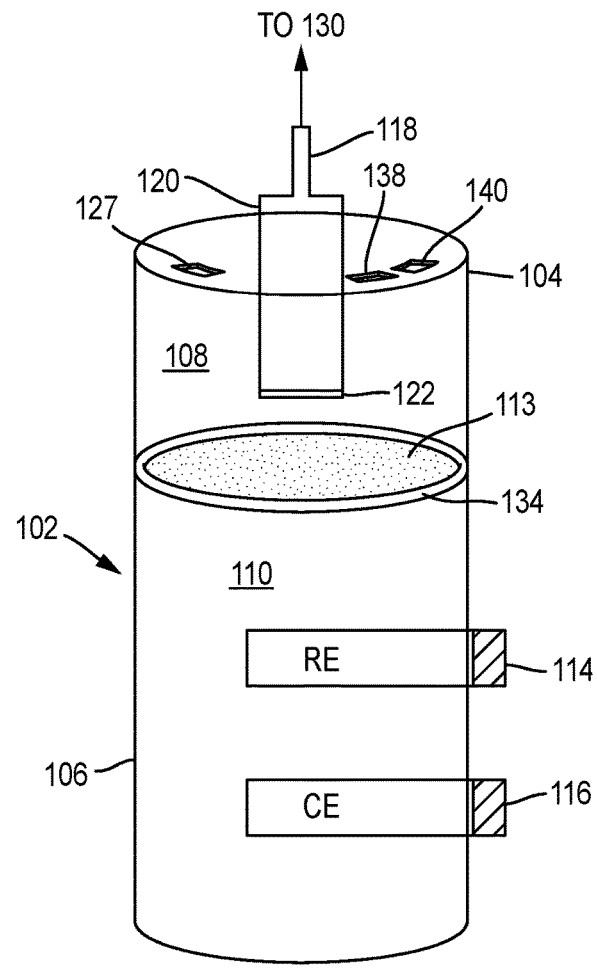
FIG. 2A is a perspective view of a test cell of the example system of FIG. 1 with a coating film disposed within the test cell, according to an embodiment.

FIG. 2A is a perspective view of the test cell 102 with the coating film 113 in place, according to an embodiment. In the example of FIG. 2A, when the coating film 113 is in place, the sealing ring 134 is positioned around the coating film 113 and seals the interfaces between the coating film 113 and the first and second chambers 104 and 106.

Figure 2B:
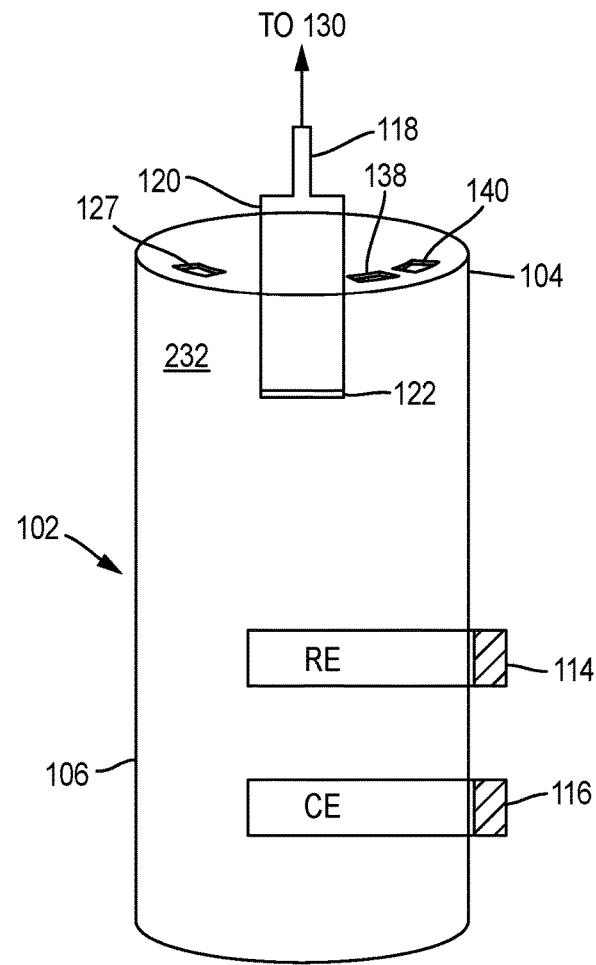
FIG. 2B is a perspective view of the test cell of the example system of FIG. 1 with the coating film of FIG. 2A removed, according to an embodiment.

In an embodiment, the corrosion rate of the sensing element 122 and the cathodic protection current density through the sensing element 122 are measured with the coating film 113 in place as in FIG. 2A and are also measured without the coating film 113 in place. FIG. 2B is a perspective view of the test cell 102 with the coating film 113 removed, according to an embodiment. In the example of FIG. 2B, the sealing ring 134 is also removed. In order to remove the coating film 113, in an embodiment, the first portion 108 of the electrically conductive solution is emptied through the first fill port 140, the second portion 110 of the electrically conductive solution is emptied through the second fill port 142, and the coating film 113 is removed along with the sealing ring 134. The test cell 102 is refilled with a first additional portion 232 of the same electrically conductive solution originally used therein. Because the coating film 113 is not in place to divide the first chamber 104 from the second chamber 106, the first additional portion 232 of the electrically conductive solution fills both the first chamber 104 and the second chamber 106.

With the coating film 113 removed from the test cell 102, the potentiostat 124 applies potential and polarizes the sensing element 122 in the manner described above, and the corrosion rate of the sensing element 122 and the cathodic protection current density through the sensing element 122 are measured. The corrosion rate and cathodic protection current density with and without the coating film 113 in place can be analyzed to determine the extent of cathodic protection current shielding of the coating film 113. In some embodiments, the corrosion rate of the sensing element 122 and the cathodic protection current density are first measured without the coating film 113 in the test cell 102 and are then measured again after the coating film 113 is disposed in the test cell 102 between the first chamber 104 and the second chamber 106.

In some embodiments, the coating film 113 is also or alternatively replaced with a different coating film. To replace the coating film 113 with a different coating film, the first portion 108 of the electrically conductive solution is first emptied through the first fill port 140. Alternatively, the part of the first additional portion 232 of the electrically conductive solution that fills the first chamber 104 is emptied through the first fill port 140, in the example where the first chamber 104 has been filled with the first additional portion 232 of the electrically conductive solution.

Figure 2C:
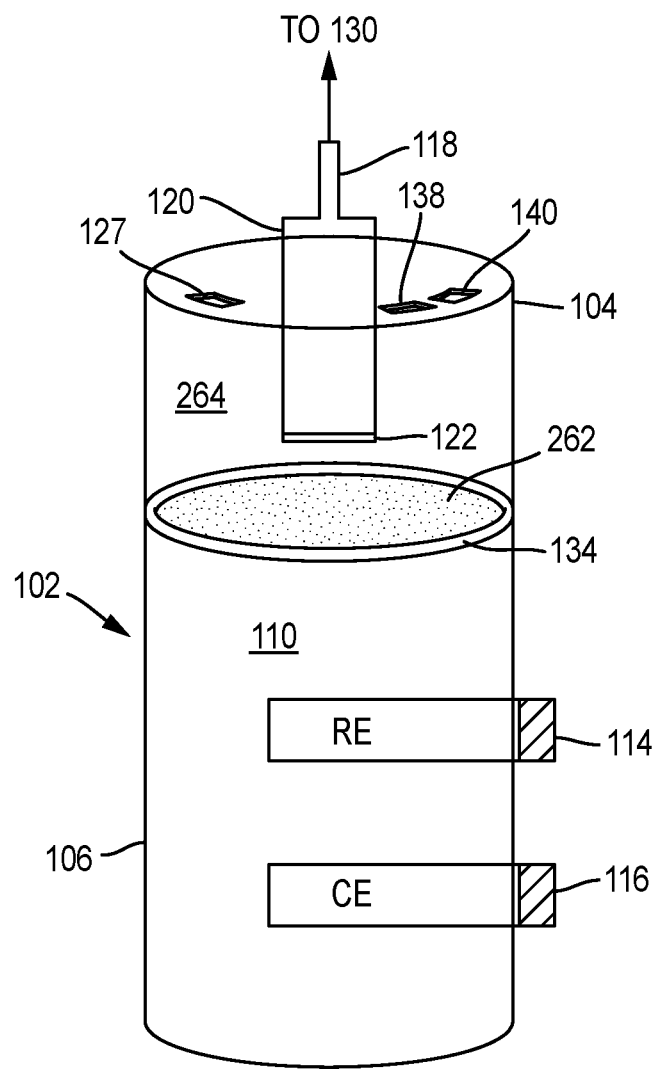
FIG. 2C is a perspective view of the test cell of the example system of FIG. 1 with a second coating film disposed within the test cell in place of the coating film of FIG. 2A, according to an embodiment.

As shown in FIG. 2C, which is a perspective view of the test cell 102 with a second coating film 262 in place, according to an embodiment, the second coating film 262 is then sealed between the first and second chambers 104 and 106 using the sealing ring 134. The second coating film 262 is made of a type of coating that is different from the type of coating used in the coating film 113. The first chamber 104 is then filled with a second additional portion 264 of the same electrically conductive solution originally used in the first chamber 104. The measurements of corrosion rate and CP current density with the second coating film 262 in place can then be performed again in the same manner as described elsewhere herein to facilitate comparison of different types of coating films. The present description at times refers to the corrosion rate and the CP current density as measured with the coating film 113 within the test cell 102 as a "first" corrosion rate and a "first" current density, respectively. Correspondingly, the present description at times refers to the corrosion rate and the CP current density with the coating film 113 removed from the test cell 102, or with a different coating film in place such as the second coating film 262, as a "second" corrosion rate and a "second" current density, respectively.

Figure 3A:
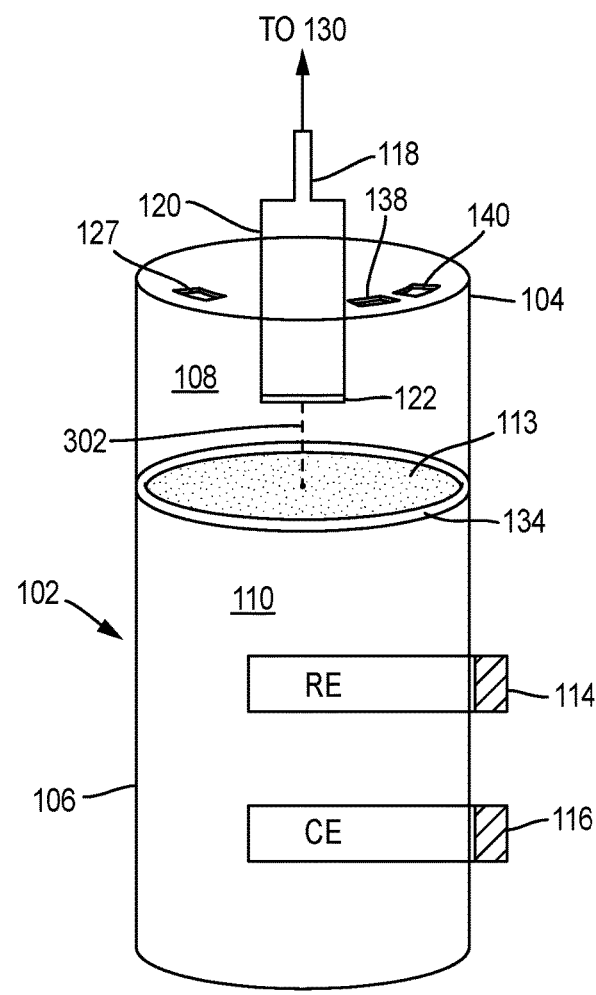
FIGS. 3A and 3B are perspective views of the test cell of the example system of FIG. 1 showing variation of a distance between an ER probe sensing element and a coating film to simulate different types and/or degrees of disbondment and/or delamination, according to various embodiments.
Figure 3B:
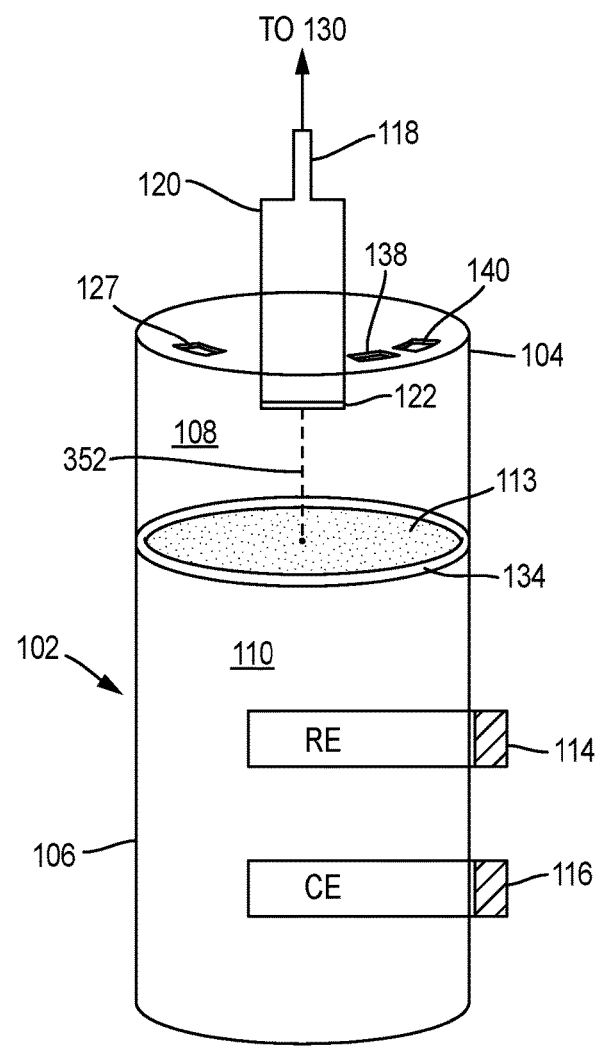

FIGS. 3A and 3B are perspective views of the test cell 102 showing variation of a distance between the sensing element 122 of the ER probe 118 and the coating film 113 to simulate different types and/or degrees of disbondment and/or delamination, according to various embodiments. FIG. 3A shows a first delamination simulated by the coating film 113 being a first distance 302 from the sensing element. Measurement of corrosion rate and CP current density as described elsewhere herein is performed in order to assess an effectiveness of a type of coating used in the coating film 113 for cathodic protection of a structure made of the type of metal used in the sensing element 122 in the presence of a disbondment and/or delamination simulated by the coating film 113 being disposed at the first distance 302 from the sensing element 122. The first distance 302 might simulate a delamination that occurs over time as cathodic protection current flows through a coating of the type used in the coating film 113 or might simulate a delamination present from a time that the coating is disposed on the object to be protected.

The arrangement of the test cell 102 in FIG. 3B simulates the effect of another disbondment and/or delamination, such as a disbondment with greater failure of adhesion of a coating to an object to be protected. As shown in FIG. 3B, the coating film 113 is at a second distance 352 from the sensing element 122, and the second distance 352 is greater than the first distance 302. In various embodiments, the change in distance from the first distance 302 to the second distance 352 is achieved by adjusting a placement of the ER probe 118 within a port in the first chamber 104. The distance is adjustable in any suitable manner to simulate a desired disbondment(s), delamination(s), or combination(s) thereof. Measurement of corrosion rate and CP current density is performed as described elsewhere herein to assess the effect of the disbondment and/or delamination simulated by the second distance 352 on the performance of the coating film 113, and/or to assess the effect of the disbondment and/or delamination simulated by the second distance 352 relative to the effect of the disbondment and/or delamination simulated by the first distance 302.

Figure 4A:
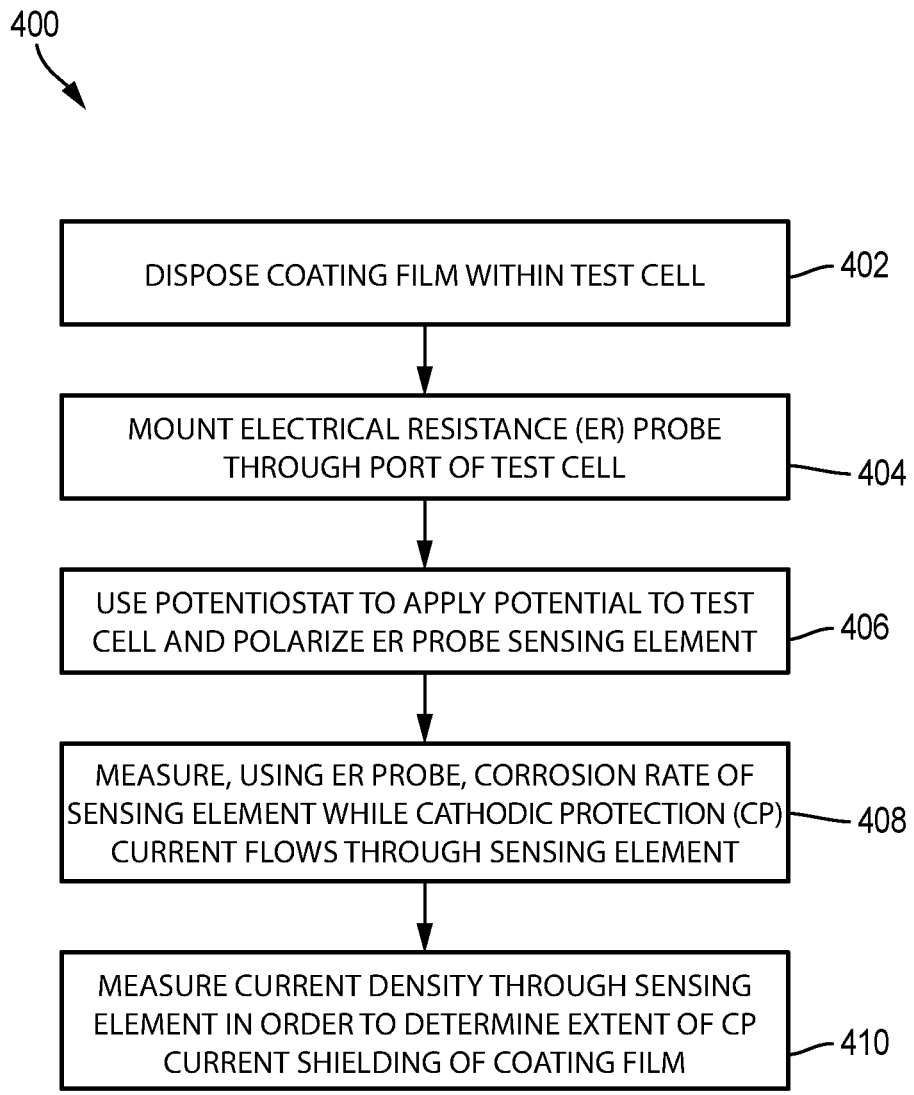
FIG. 4A is a flow chart of an example method for analyzing cathodic protection current shielding of a coating, according to an embodiment.

FIG. 4A is a flow chart of an example method 400 for analyzing cathodic protection current shielding of a coating, such as a coating of the type included in the coating film 113, according to an embodiment. The method 400 and other methods disclosed herein can be implemented by and/or using components of the example system 100 of FIG. 1. Various actions described with respect to the method 400 and other methods disclosed herein can be performed using components and techniques illustrated in and described with reference to the embodiments shown in FIGS. 1, 2A, 2B, 3A, and 3B.

Portions of this and other methods disclosed herein can be performed on or using a custom or preprogrammed device, circuit, or processor, such as the workstation 132, the potentiostat 124, and/or other device or circuit configured by code or logic to carry out its assigned task. The device, circuit, or processor can be or include, for example, a dedicated or shared hardware device, such as the potentiostat 124 and/or the workstation 132. The device, circuit, or processor can include a non-transitory computer readable medium (CRM, such as read-only memory (ROM), flash drive, or disk drive) storing instructions that, when executed on one or more processors, cause portions of the method 400 (or other disclosed methods) to be carried out. For example, in some embodiments the workstation 132 carries out actions necessary for the measurement of corrosion rate using data received from the ER probe 118, as further discussed elsewhere herein. It should be noted that in other embodiments, the order of the operations can be varied, and that some of the operations can be omitted.

The example method 400 begins with disposing 402 a coating film within a test cell, such as disposing the coating film 113 between the first chamber 104 and the second chamber 106 of the test cell 102. For example, a user can select the coating film 113 such that the coating film 113 is made of the type of coating for which the extent of CP current shielding is desired to be simulated.

The method 400 also includes mounting 404 an electrical resistance (ER) probe through a port of the test cell. For example, the probe mounting 120 of the ER probe 118 can be placed through a port of the first chamber 104 of the test cell 102 as shown in FIG. 1 and positioned so as to allow the ER probe 118 to use the electrical resistance method to measure corrosion rate of the sensing element 122.

The method 400 additionally includes using 406 a potentiostat to apply potential to the test cell and polarize a sensing element of the ER probe. For example, the potentiostat 124 can be connected to the reference electrode 114, to the counter electrode 116, and to the working electrode terminal 127 as shown and described with reference to FIG. 1. The potentiostat 124 applies a potential to the test cell 102 by applying potential to the sensing element 122 by way of the connection of the potentiostat 124 to the working electrode terminal 127. The potentiostat 124 also applies potential to the reference electrode 114, as described above, and controls a potential difference between the sensing element 122 and the reference electrode 114 based on the cathodic protection conditions being simulated.

The method 400 also includes measuring 408, using the ER probe, a corrosion rate of the ER probe sensing element while a cathodic protection current flows through the sensing element. As discussed above, when the potentiostat 124 applies potential to the test cell 102 and polarizes the sensing element 122, with the first and second chambers 104 and 106 having been filled with an electrically conductive solution, a cathodic protection current flows from the counter electrode 116 through the coating film 113 and the sensing element 122. The measurement of the corrosion rate can be performed as described with respect to FIG. 1.

The method further includes measuring 410 a current density of the CP current that flows through the sensing element in order to determine an extent of CP current shielding of the coating film. As described with respect to FIG. 1, the potentiostat 124 uses the indication of the potential applied to the sensing element 122 relative to the potential applied to the reference electrode 114 in measuring the current density of the CP current flowing through the first chamber 104 and thus, the sensing element 122. The potentiostat 124 and/or the workstation 132 coupled thereto analyzes the current density data to determine an extent of CP current shielding of the coating film 113. Accordingly, the method 400 achieves in-situ simulation of CP current shielding and, together with the measurement of corrosion rate described above, provides information regarding CP current shielding characteristics of the particular type of coating used in the coating film 113. The method 400 further allows information to be provided regarding CP current shielding characteristics of the particular type of coating in the presence of a disbondment and/or delamination simulated by a distance between the coating film 113 and the sensing element 122, as described with reference to FIGS. 3A and 3B.

Figure 4B:
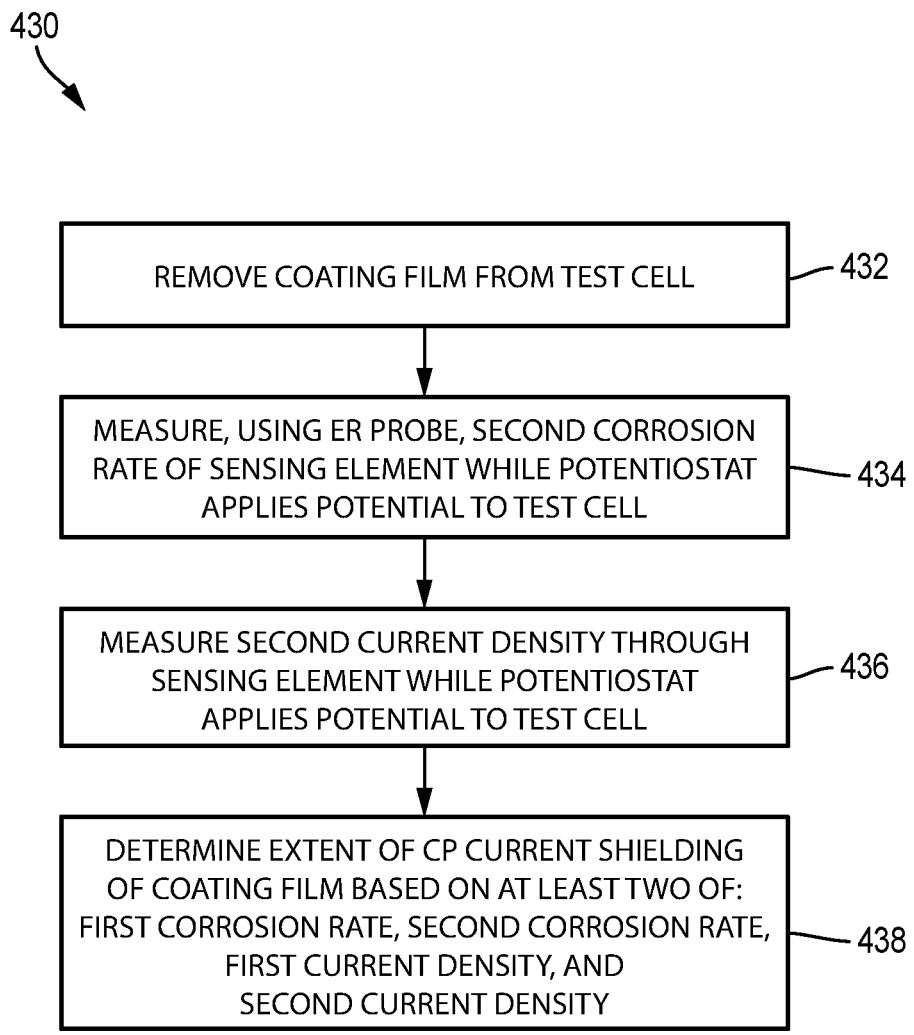
FIG. 4B is a flow chart of another example method for analyzing cathodic protection current shielding of a coating, according to an embodiment.

FIG. 4B is a flow chart of another example method 430 for analyzing cathodic protection current shielding of a coating, according to an embodiment. In various embodiments, as described below, the example method 430 includes actions performed without the coating film 113 in place (i.e., not disposed within the test cell 102 between the first and second chambers 104 and 106). In such embodiments, a corrosion rate and/or current density measured without the coating film 113 in place are used along with the corrosion rate and/or current density measured with the coating film 113 in place to further analyze CP current shielding of the coating film 113. Thus, in various embodiments, the example method 430 is performed after the example method 400 is performed. In other embodiments, actions described with respect to the example method 430 are performed before the example method 400.

The example method 430 begins with removing 432 the coating film from the test cell, such as by removing the coating film 113 from the test cell 102 in the manner described above with respect to FIG. 2B.

The example method 430 also includes measuring 434, using the ER probe, a second corrosion rate of the ER probe sensing element while the potentiostat applies the potential to the test cell. For example, after the coating film 113 is removed from the test cell 102, the potentiostat 124 applies the same potentials to the sensing element 122 and the reference electrode 114 as were applied when the coating film 113 was disposed within the test cell 102. The ER probe 118 measures the second corrosion rate by measuring the corrosion rate of the sensing element 122 when the coating film 113 is not disposed within the test cell 102. As discussed with respect to FIG. 4A, in this example the first corrosion rate is the corrosion rate of the sensing element 122 when the coating film 113 is disposed within the test cell 102.

The example method 430 additionally includes measuring 436 a second current density through the sensing element while the potentiostat applies the potential to the test cell. For example, while the potentiostat 124 applies potential to the sensing element 122 and the reference electrode 114 in the manner described above, the potentiostat 124 measures the second current density through the sensing element 122 while the coating film 113 is not disposed within the test cell 102. As discussed with respect to FIG. 4A, in this example the first current density is the current density through the sensing element 122 when the coating film 113 is disposed within the test cell 102.

The example method 430 further includes determining 438 the extent of CP current shielding of the coating film based on at least two of: the first corrosion rate as measured in the manner described with respect to FIG. 4A, the second corrosion rate, the first current density as measured in the manner described with respect to FIG. 4A, and the second current density. Two or more of these measurements are compared and/or analyzed in any suitable manner to determine the extent of CP current shielding of the coating film 113. In one example, comparison of the first corrosion rate and the second corrosion rate is used to assess an effect of the coating film 113 on corrosion rate, and thus can be used to infer information about the extent of CP current shielding of the coating film 113. In one example, comparison of the first current density and the second current density is also or alternatively used to determine an effect of the coating film 113 on cathodic protection current density and thereby to determine information regarding an extent of CP current shielding of the coating film 113.

Figure 4C:
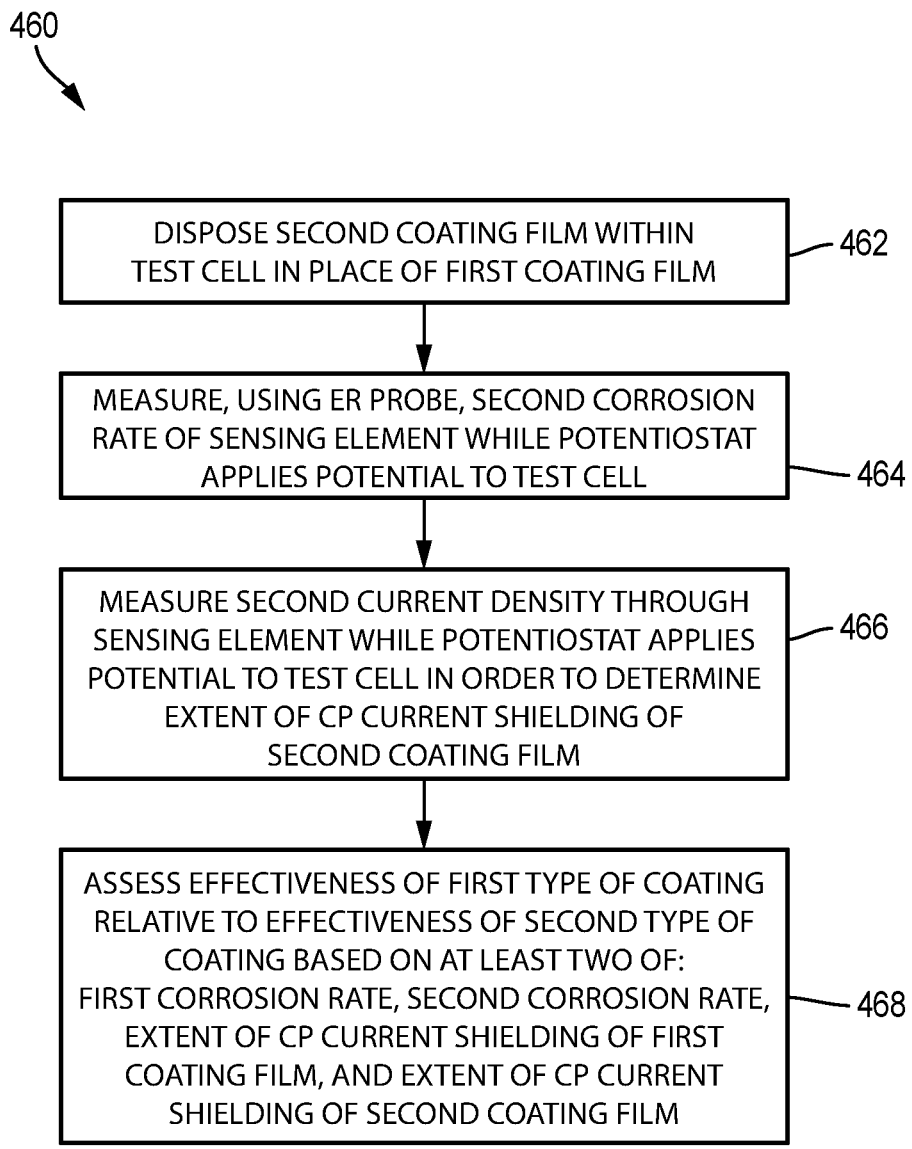
FIG. 4C is a flow chart of another example method for analyzing cathodic protection current shielding of a coating, such as a coating of a second type, according to an embodiment.

FIG. 4C is a flow chart of another example method 460 for analyzing cathodic protection current shielding of a coating, such as a coating of the type included in the second coating film 262 as described with reference to FIG. 2B, according to an embodiment. In various embodiments, the example method 460 is performed after the example method 400 is performed and facilitates comparison of CP current shielding characteristics of different types of coating films. In other embodiments, actions described with respect to the method 400 are performed before the method 460 is performed. In some embodiments, only the methods 400 and 460 are performed, and the method 430 is not performed. In other embodiments, the methods 400, 430, and 460 are all performed in any suitable order. In various embodiments, performance of all of the methods 400, 430, and 460 facilitates comparison of CP current shielding characteristics of different types of coating films and evaluation of the performance of one or more types of coating films based on measurements made without such a coating film(s) disposed within the test cell 102.

In any event, the example method 460 begins with disposing 462 a second coating film within the test cell in place of the first coating film, where the first coating film is a coating film initially used in simulating and analyzing CP current shielding, such as that described with reference to FIG. 4A. The second coating film can be chosen for comparison to the first coating film, such as in the example of comparing the second coating film 262 to the first coating film 113.

The method 460 also includes measuring 464, using the ER probe, a second corrosion rate of a sensing element of the ER probe while the potentiostat applies the potential to the test cell. As further described with reference to FIG. 4A, the first corrosion rate is the corrosion rate while the first coating film, such as the coating film 113, is disposed within the test cell. For example, the potentiostat 124 can be connected so as to apply potential to the sensing element 122 and the reference electrode 114 in the manner described with respect to FIG. 4A, to cause the CP current to flow from the counter electrode 116 through the second coating film 262 and the sensing element 122, with the second corrosion rate being measured using the electrical resistance method.

The method 460 additionally includes measuring 466 a second current density through the ER probe sensing element while the potentiostat applies the potential to the test cell in order to determine an extent of CP current shielding of the second coating film. As further described with reference to FIG. 4A, the first current density is the current density through the first coating film, such as the coating film 113, while the first coating film is disposed within the test cell. The second current density is measured using the potentiostat 124 when, for example, the second coating film 262 is in place in the same or a similar manner as the measurement of the first current density when the first coating film 113 is in place.

The method 460 further includes assessing 468 an effectiveness of the first type of coating relative to an effectiveness of the second type of coating based on at least two of: the first corrosion rate, the second corrosion rate, the extent of CP current shielding of the first coating film, and the extent of CP current shielding of the second coating film. For example, the workstation 132 can be configured to compare the first corrosion rate to the second corrosion rate and/or can compare the extent of CP current shielding of the first coating film 113 to the extent of CP current shielding of the second coating film 262. The workstation 132 can thereby generate data indicative of the relative performance of the first coating film 113 and the second coating film 262 for cathodic protection based on the simultaneous in-situ determinations of corrosion rate and CP current shielding that are achieved by techniques of the present disclosure.

Portions of the methods described herein can be performed by software or firmware in machine readable form on a tangible (e.g., non-transitory) storage medium. For example, the software or firmware can be in the form of a computer program including computer program code adapted to cause the workstation 132 or potentiostat 124 to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media, but propagated signals by themselves are not examples of tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

What is claimed is:

1. A system for analyzing cathodic protection (CP) current shielding of a coating, the system comprising:
    a test cell configured to have a coating film disposed therein and dividing the test cell into a first chamber and a second chamber having a greater volume than the first chamber, the first and second chambers to be filled with an electrically conductive solution surrounding the coating film;
    an electrical resistance (ER) probe mounted through a port of the first chamber, the ER probe comprising a sensing element positioned within the first chamber such that when the first and second chambers are filled with the electrically conductive solution, the sensing element is in contact with the electrically conductive solution in the filled first chamber; and
    a potentiostat configured to:
        apply potential to electrodes of the filled first and second chambers in order to polarize the sensing element of the ER probe such that the ER probe measures resistance data of the polarized sensing element in situ and indicative of a corrosion rate of the polarized sensing element when the coating film is disposed within the test cell and while a CP current flows from the second chamber through the coating film and then through the polarized sensing element; and
        measure a CP current density in situ through the coating film of the CP current flowing from the second chamber through the polarized sensing element simultaneous with the in-situ measuring of the resistance data of the polarized sensing element in order to indicate an extent of CP current shielding of the coating film.

2. The system of claim 1, wherein the corrosion rate is a first corrosion rate, wherein the current density is a first current density, the system further comprising a workstation communicatively coupled to the ER probe, wherein when the coating film is not disposed within the test cell, the ER probe is configured to measure data indicative of a second corrosion rate of the sensing element when the potential is applied to the test cell to allow the workstation to compare the first and second corrosion rates of the sensing element, and the potentiostat is configured to measure a second current density through the sensing element when the potential is applied to the test cell in order to further indicate the extent of CP current shielding of the coating film.

3. The system of claim 1, wherein the coating film is a first coating film comprising a first type of coating, wherein the corrosion rate is a first corrosion rate, wherein the current density is a first current density, the system further comprising a workstation communicatively coupled to the ER probe, wherein when a second coating film comprising a second type of coating is disposed within the test cell in place of the first coating film, the ER probe is configured to measure data indicative of a second corrosion rate of the sensing element when the potential is applied to the test cell to allow the workstation to compare the first and second corrosion rates of the sensing element, and the potentiostat is configured to measure a second current density through the sensing element when the potential is applied to the test cell to allow the workstation to compare extents of CP current shielding of the first coating film and the second coating film.

4. The system of claim 1, further comprising a counter electrode positioned at least partially inside the test cell.

5. The system of claim 4, further comprising a reference electrode positioned at least partially inside the test cell, wherein the potentiostat is connected to the reference electrode, to the counter electrode, and to a terminal electrically connected to the sensing element.

6. The system of claim 1, wherein the sensing element comprises a carbon steel sensing element.

7. The system of claim 1, further comprising:
    an ER data logger communicatively coupled to the ER probe and configured to receive the data indicative of the corrosion rate of the sensing element; and
    a workstation communicatively coupled to the ER data logger and configured to process the data indicative of the corrosion rate of the sensing element to determine the corrosion rate of the sensing element.

8. The system of claim 1,
    wherein the first chamber is configured to contain a first portion of the electrically conductive solution, and
    wherein the second chamber is configured to contain a second portion of the electrically conductive solution.

9. The system of claim 8, wherein the test cell further comprises a sealing ring disposed between the coating film and an inner wall of the test cell.

10. The system of claim 8, wherein the test cell further comprises a pH probe port in the first chamber, the pH probe port configured to have a pH probe positioned therein to measure a pH of the electrically conductive solution.

11. The system of claim 8, wherein the test cell further comprises:
a first fill port in the first chamber, the first fill port configured to receive the first portion of the electrically conductive solution into the first chamber; and
a second fill port in the second chamber, the second fill port configured to receive the second portion of the electrically conductive solution into the second chamber.

12. The system of claim 1, further comprising a processor configured by code to control the potentiostat to simultaneously:
apply the potential to the electrodes of the filled first and second chambers in order to polarize the sensing element of the ER probe such that the ER probe measures the resistance data of the polarized sensing element in situ and indicative of the corrosion rate of the polarized sensing element; and
measure the CP current density in situ through the coating film of the CP current flowing from the second chamber through the polarized sensing element in order to indicate the extent of CP current shielding of the coating film.

13. An apparatus for analyzing cathodic protection (CP) current shielding of a coating, the apparatus comprising:
a first chamber configured to be filled with a first portion of an electrically conductive solution, the first chamber comprising an electrical resistance (ER) probe port and a working electrode terminal;
a second chamber configured to be filled with a second portion of the electrically conductive solution, the second chamber comprising a reference electrode terminal and a counter electrode terminal, wherein a volume of the second chamber is greater than a volume of the first chamber, wherein the first chamber and the second chamber are configured to be divided from each other by a coating film disposed between the first chamber and the second chamber;
an ER probe mounted through the ER probe port of the first chamber, the ER probe comprising a sensing element positioned within the first chamber, in contact with the electrically conduction solution of the filled first chamber, and electrically connected to the working electrode terminal of the filled first chamber, wherein when potential is applied to the electrode terminals of the filled first and second chambers such that the sensing element is polarized, the ER probe measures resistance data of the polarized sensing element in situ and indicative of a corrosion rate of the polarized sensing element when the coating film is disposed between the first chamber and the second chamber and while a CP current flows from the second chamber through the coating film and then through the polarized sensing element;
a potentiostat configured to electrically connect to and control the applied potential to the working electrode terminal of the first chamber, the reference electrode terminal of the second chamber, and the counter electrode terminal of the second chamber, wherein when the working electrode terminal of the first chamber, the reference electrode terminal of the second chamber, and the counter electrode terminal of the second chamber are connected to the potentiostat, the potentiostat is further configured to of measure a CP current density in situ through the coating film of the CP current flowing from the second chamber through the polarized sensing element when the potential is applied to the electrode terminals of the filled first and second chambers and simultaneous with the in-situ measuring of the resistance data of the polarized sensing element in order to indicate an extent of CP current shielding of the coating film; and
a processor configured by code to control the potentiostat to simultaneously:
apply the potential to the electrode terminals of the filled first and second chambers such that the sensing element is polarized and the ER probe measures resistance data of the polarized sensing element in situ and indicative of a corrosion rate of the polarized sensing element; and
measure the CP current density in situ through the coating film of the CP current flowing from the second chamber through the polarized sensing element in order to indicate the extent of CP current shielding of the coating film.

14. The apparatus of claim 13, wherein the corrosion rate is a first corrosion rate, wherein the current density is a first current density, and wherein when the coating film is not disposed between the first chamber and the second chamber, the ER probe is configured to measure data indicative of a second corrosion rate of the sensing element when the potential is applied to the first chamber to facilitate comparison of the first and second corrosion rates of the sensing element, and the working electrode terminal is configured to allow a measurement of a second current density through the sensing element when the potential is applied to the first chamber in order to further indicate the extent of CP current shielding of the coating film.

15. The apparatus of claim 13, wherein the coating film is a first coating film comprising a first type of coating, wherein the corrosion rate is a first corrosion rate, wherein the current density is a first current density, and wherein when a second coating film comprising a second type of coating is disposed between the first chamber and the second chamber in place of the first coating film, the ER probe is configured to measure data indicative of a second corrosion rate of the sensing element to facilitate comparison of the first and second corrosion rates of the sensing element, and the working electrode terminal is configured to allow a measurement of a second current density through the sensing element when the potential is applied to the first chamber to facilitate comparison of extents of CP current shielding of the first coating film and the second coating film.

16. The apparatus of claim 13, further comprising a sealing ring disposed around the coating film at an interface between the first chamber and the second chamber.

17. The apparatus of claim 13, wherein the first chamber further comprises a pH probe port configured to have a pH probe positioned therein to measure a pH of the electrically conductive solution.

18. A method for analyzing cathodic protection (CP) current shielding of a coating, the method comprising:
disposing a coating film within a test cell, the coating film dividing the test cell into a first chamber and a second chamber having a greater volume than the first chamber;
filling the first and second chambers with an electrically conductive solution surrounding the coating film;
mounting an electrical resistance (ER) probe through a port of the first chamber such that a sensing element of the ER probe is in contact with the electrically conductive solution in the filled first chamber;

using a potentiostat to apply potential to electrodes of the filled first and second chambers in order to polarize the sensing element of the ER probe to a first potential at which a structure to be protected will be polarized during cathodic protection;

measuring, using the ER probe, a corrosion rate of the polarized sensing element in situ while a CP current flows from the second chamber through the coating film and then through the polarized sensing element; and measuring, using the potentiostat, a CP current density in situ through the coating film of the CP current flowing from the second chamber through the polarized sensing element simultaneous with the in-situ measuring of the corrosion rate of the polarized sensing element in order to determine an extent of CP current shielding of the coating film.

19. The method of claim 18, wherein the corrosion rate is a first corrosion rate, wherein the current density is a first current density, the method further comprising:

removing the coating film from the test cell;

measuring, using the ER probe, a second corrosion rate of the sensing element while the potentiostat applies the potential to the test cell;

measuring a second current density through the sensing element while the potentiostat applies the potential to the test cell; and determining the extent of CP current shielding of the coating film based on at least two of: the first corrosion rate, the second corrosion rate, the first current density, and the second current density.

20. The method of claim 18, wherein the coating film is a first coating film comprising a first type of coating, wherein the corrosion rate is a first corrosion rate, wherein the current density is a first current density, the method further comprising:

disposing a second coating film within the test cell in place of the first coating film, the second coating film comprising a second type of coating;

measuring, using the ER probe, a second corrosion rate of the sensing element while the potentiostat applies the potential to the test cell;

measuring a second current density through the sensing element while the potentiostat applies the potential to the test cell in order to determine an extent of CP current shielding of the second coating film; and assessing an effectiveness of the first type of coating relative to an effectiveness of the second type of coating based on at least two of: the first corrosion rate, the second corrosion rate, the extent of CP current shielding of the first coating film, and the extent of CP current shielding of the second coating film.

21. The method of claim 18, wherein the electrodes of the filled first and second chambers comprise a reference electrode of the second chamber, a counter electrode of the second chamber, and a terminal of the first chamber electrically connected to the sensing element.

* * * * *